Patented May 5, 1931

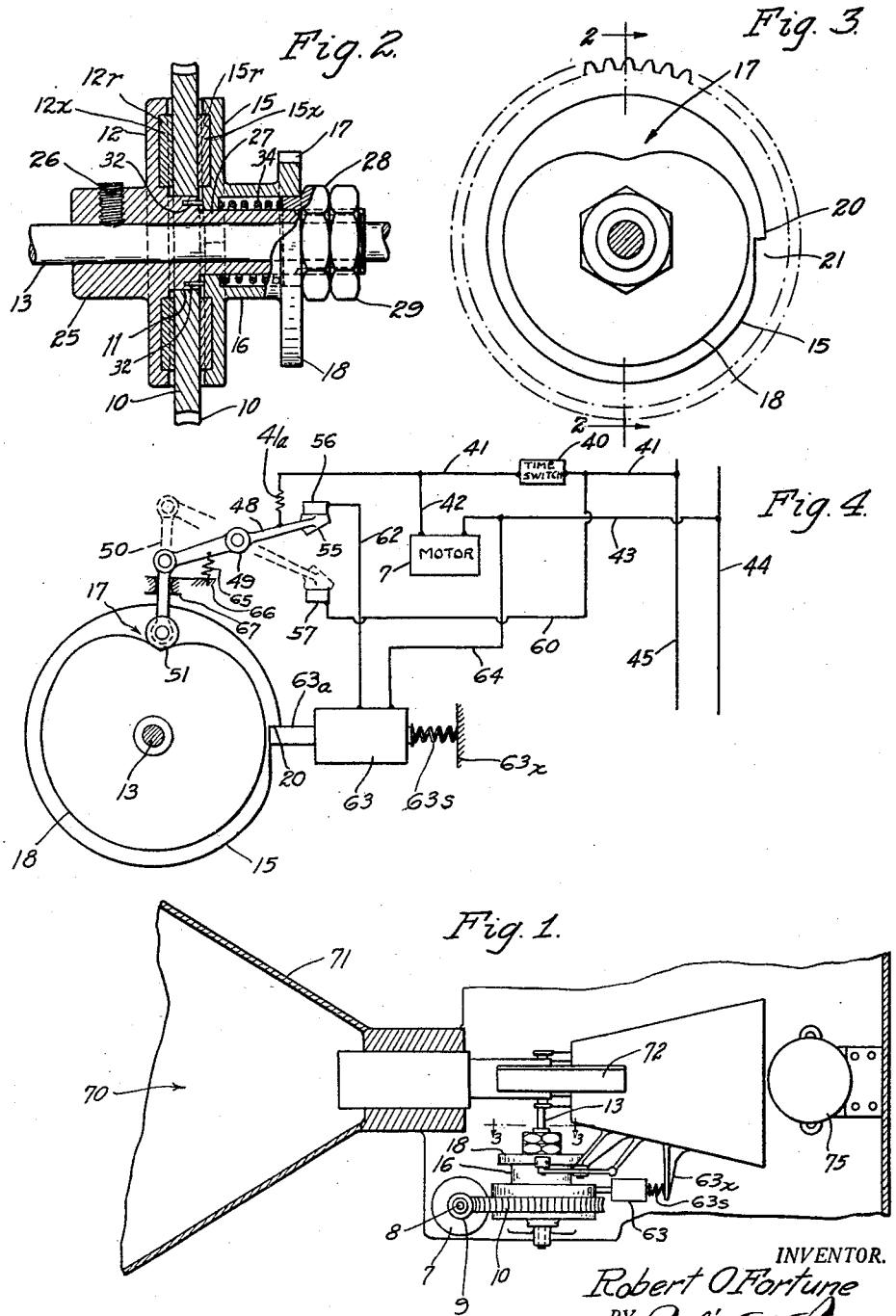

1,804,051

UNITED STATES PATENT OFFICE

ROBERT O. FORTUNE, OF LOS ANGELES, CALIFORNIA

INTERMITTENT CONTROL MECHANISM

Application filed May 20, 1930. Serial No. 454,068.

This invention relates to an improved device for starting and stopping the advance movement of display advertising devices and other mechanisms requiring intermittent operation.

An object of the invention is to provide an improved arrangement of the electrically operated elements which cooperate with the other features of the invention.

Another object of the invention is to provide an improved friction clutch construction which is peculiarly adapted to control the operation of devices of the character to which the invention pertains.

The invention is illustrated as applied to advertising devices of the class wherein a strip of photographic film, or other material upon which the advertising matter is placed, is advanced step by step at predetermined intervals in order to successively display the advertising.

Other objects, advantages and features of invention may hereinafter appear.

Referring to the accompanying drawings which illustrate what is at present deemed to be a preferred embodiment of the invention, Fig. 1 is a general plan view, partly in section, of the complete apparatus, portions thereof being broken away to contract the view.

Fig. 2 is a longitudinal mid-section of the clutch device, one end portion thereof being shown in side elevation.

Fig. 3 is a section on line 3—3 of Fig. 1.

Fig. 4 is a diagram showing an end view of the clutch and illustrating the electrically controlled means for governing the action of said clutch.

Referring in detail to the drawings, the motor 7 is provided with a motor shaft 8 whereon is fixed a worm 9 that is in mesh with a large driven worm gear wheel 10. Said worm wheel 10 is loosely mounted upon the hub portion 11 of the clutch disc 12, said hub portion 11 being of substantially the same length as the thickness of disc 10.

Clutch disc 15 cooperates with disc 12 and is provided at the side thereof which is opposite to said disc 12 with a hub or sleeve portion 16 which carries, at its outer end, the cam disc 18 having the cam notch 17. The clutch disc 15 is provided with a ratchet shoulder 20 produced by the cutting thereinto of notch 21.

The clutch disc 12 at the side thereof opposite to the wheel 10 is provided with a relatively large hub portion 25 having tapped thereinto a set screw 26 whereby the clutch as a whole is secured to the shaft 13 to rotate therewith. At the other side of the disc 12 there is formed, preferably integral with said disc and the hub 25, an axial sleeve 27, said sleeve being of sufficient length to receive thereon the clutch discs 15 and 18 together with the hub or outer sleeve portion 16 which connects said discs 15 and 18, said sleeve 27 being extended still further to provide room for screwing thereonto the securing nut 28 and lock nut 29.

Means are provided for permitting the portion of the clutch construction at the right of the wheel 10 as seen in Fig. 2 to move toward and from said wheel 10 while still rotating with the remaining portion of the clutch. A number of arrangements might be employed for this purpose, other than that which is shown in Fig. 1 of the drawings, which is two pins 32 which are inserted into the left face of the disc 15, the projecting portions of these pins having a working fit within recesses which are provided in the portion of the clutch at the left of the right hand face of the wheel 10.

The internal diameter of the sleeve portion 16 of the clutch is sufficiently great to provide an annular clearance therewithin between it and the sleeve 27. Within the annular space thus provided is placed a compression spring 34 which, when the nuts 28 and 29 are sufficiently screwed down, provides the proper frictional engagement of the clutch disc 15 against the wheel 10, so that, when the clutch is not hindered from rotating by means later described, the rotation of the wheel 10 will also, through the clutch, rotate the power transmitting shaft 13.

Referring to the electrical connections, the time controlled or manually controlled switch 40 is located upon a feed wire 41 from which a wire 42 branches to the motor 7. From the motor 7 a branch wire 43 leads back to one of the line wires 44, the feed wire 41 being connected with the other line wire 45.

The feed wire 41 is extended to a switch arm 48 with which it is connected by an extensible portion 41a, said switch arm 48 being pivotally mounted between its ends at 49, one end of said switch arm 48 being pivotally connected with an operating arm 50 which carries at its lower end a roller 51 that cooperates with the cam disc 15. The other end of switch arm 48 carries a double contact 55 which when the roller 51 is in the cam notch 17, is in engagement with a terminal 56, and when the roller 41 has been forced out of the notch 17, said contact 55 is brought into engagement with another stationary terminal 57. The terminal 57 is connected by a wire 60 to the feed wire 41 at a point between the switch 40 and the line wire 45. The terminal 56 is connected by a wire 62 with the solenoid 63, the circuit through the solenoid being completed by a wire 64 which leads to the wire 43. When said solenoid is not supplied with current its armature 63a is moved into engagement with disc 15 by means of a weak compression spring 63s which abuts against an abutment 63x.

In order to maintain the roller 51 carried by the arm 50 which operates the circuit changing switch 48, in contact with the periphery of the disc 18, a tension spring 65 is secured to one end of said arm 48 and is anchored at its other end to an anchorage 66. The movements of the roller-carrying arm 50 are directed by means of a guide 67, a fragment of which is shown in section.

The time controlled apparatus of this invention may be connected up with various mechanical devices which it is desired to intermittently supply with driving power, Fig. 1 of the drawings illustrating the connection of the device with an advertising apparatus. Referring more particularly to this view, 70 designates a motion picture projecting machine having a reflector 71 and a reel housing 72 within which are contained the reels (not shown) which carry the advertising matter or other indicia to be displayed. These reels are intermittently advanced by means of the power driven shaft 13 already described. The light may be furnished from any suitable source as from the incandescent lamp 75.

The invention is limited to the specific construction of clutch and cooperating mechanism shown, but changes, such as come within the scope of the appended claims, may be made without departing from the spirit of the invention. A desirable form of clutch is shown in Fig. 2 wherein the clutch disc 12 is provided on its gripping face with a large annular recess 12r and the other clutch disc 15 is provided with a like recess 15r. In the recess 12r is placed a wear-resisting facing or packing 12x, while in the recess 15r is placed a like packing material 15x.

In operation, when the time operated or hand operated switch 40 is momentarily closed, current is supplied to the motor 7 and, assuming the switch arm 48 to be in the position shown in full lines in Fig. 4, current is also supplied to the solenoid 63. As a result the solenoid will be operated, withdrawing its armature from the ratchet shoulder 20 and permitting the friction driven clutch elements 12 and 15 to be rotated together with the shaft 13 whereon they are mounted. From said shaft 13 power will be transmitted to the means for advancing the advertising reel (not shown). As soon as the shaft 13 is rotated a short distance the cam element 51 will be withdrawn from the cam notch 17 and forced farther away from the center of the cam disc 15, thus causing the secondary switch arm 48 to leave the contact 56 and engage the contact 57. Thereupon current will be supplied through the wires 45, adjoining portion of wire 41, wire 60, switch arm 48, wire 41a, adjoining portion of wire 41 and wire 42 to the motor and thence from the motor through the wire 43 to the negative pole by way of the main line wire 44, thus cutting out the switch 40, which the operator or the clock work, as the case may be, will only close momentarily. After the shaft 13 has made a complete rotation, the cam element 51 will drop back into the notch 17 thus restoring the circuit as it was in the first instance in order that the same cycle of operations may be repeated by again momentarily closing the main switch 40.

Claims:

1. A time controlled mechanism for advancing a display strip comprising a motor, a wheel operatively related to said motor to be driven thereby, a shaft whereon said wheel is loosely mounted, a clutch mounted upon and fixed to said shaft, said clutch comprising two gripping elements between which said wheel is situated, a reel operatively related to said shaft to be advanced thereby, a display strip advanceable by the rotation of said wheel, said gripping elements engaging said wheel with sufficient friction to cause the rotation of said wheel to advance said display strip, said clutch comprising a disc having a ratchet shoulder, a solenoid having an armature which normally obstructs the advance of said shoulder to prevent the rotation of said clutch, and a time controlled means to intermittently energize said solenoid to withdraw its said armature from said shoulder thus permitting said clutch and the shaft to which it is attached to perform a complete rotation.

2. A time controlled mechanism for advancing a display strip comprising an electrically driven motor, a wheel operatively related to said motor to be rotated thereby, a shaft whereon said wheel is loosely mounted, a clutch mounted upon and fixed to said shaft, said clutch comprising means to frictionally grip said wheel with a moderate force, a reel operatively related to said shaft to be advanced thereby, a display strip advanceable by the rotation of said reel, said gripping elements engaging said wheel with sufficient friction to cause the rotation of said wheel to rotate said shaft and thereby advance said display strip, said clutch comprising a disc having a ratchet shoulder, a solenoid having an armature which normally obstructs the advance of said shoulder to prevent the rotation of said clutch, conductors forming an electric circuit which includes said motor and solenoid, a switch device to control the circuit through said solenoid, there being a cam device which rotates with said clutch to operate said switch device, and a time controlled switch which controls the circuit through said motor independently of said solenoid.

3. A time controlled mechanism comprising an electrically driven motor, a wheel operatively connected with said motor to be driven thereby, a power transmitting shaft, a clutch mounted upon said shaft and having a hub portion through which said shaft extends, said clutch being fastened to said shaft to rotate therewith and frictionally engaging said wheel to be thereby at times rotated, said clutch having a cam portion and also a ratchet shoulder, a solenoid having an armature movable into and out of engagement with said ratchet shoulder, conductors forming a main electric circuit which when complete supplies current to both said solenoid and motor, other conductors which cooperate with the first named conductors to form an auxiliary circuit through said motor, a starting switch located upon a conductor which is common to both of said circuits, a circuit changing switch operatively related to the cam portion of said clutch to be intermittently operated thereby to change the supply of current to the motor from the main motor circuit to the auxiliary motor circuit, said circuit changing switch being positional to supply current controlled by the starting switch to the solenoid, said solenoid being at such time operable by said starting switch to withdraw its armature from the ratchet shoulder of the clutch to permit said clutch to rotate together with the motor driven wheel which is in frictional engagement therewith, and a spring tending to move the armature of said solenoid into engagement with the ratchet shoulder of said solenoid.

4. A time controlled mechanism comprising an electrically driven motor, a wheel operatively connected with said motor to be driven thereby, a power transmitting shaft, a clutch frictionally engaging said wheel to be thereby at times rotated, said clutch having a ratchet shoulder, a solenoid having an armature movable into and out of engagement with said ratchet shoulder, conductors forming a main electric circuit which when complete supplies current to both said solenoid and motor, other conductors which cooperate with the first named conductors to form an auxiliary circuit through said motor, a starting switch located upon a conductor which is common to both of said circuits, a circuit changing switch operatively related to said clutch to be intermittently positioned thereby to change the supply of current to the motor from the main motor circuit to the auxiliary motor circuit, said circuit changing switch being positional to supply current controlled by the starting switch to the solenoid, said solenoid being at such times operable by said starting switch to withdraw its armature from the ratchet shoulder of the clutch to permit said clutch to rotate together with the motor driven wheel which is in frictional engagement therewith, and a spring tending to move the armature of said solenoid into engagement with the ratchet shoulder of said solenoid, said clutch being connected with the recited power transmitting shaft to rotate the latter intermittently.

5. A time controlled mechanism comprising an electrically driven motor, a wheel operatively connected with said motor to be driven thereby, a power transmitting shaft, a clutch operatively connected with said power transmitting shaft to rotate the latter intermittently, said clutch being in frictional engagement with said wheel to be thereby at times rotated, an electro-magnetic device operatively related to said clutch to arrest the rotation thereof at times and at other times to release said clutch to permit it to rotate with said wheel, conductors forming a main electric circuit which when energized supplies current to both said electromagnetic device and said motor, other conductors which cooperate with the first named conductors to form an auxiliary circuit through said motor, a starting switch located upon a conductor which is common to both of said circuits, and a circuit changing switch operatively related to said clutch to be intermittently operated, thereby to change the supply of current to the motor from the main motor circuit to the auxiliary motor circuit, said circuit changing switch being positional to supply current controlled by the starting switch to said electro-magnetic device, said device being at such times operable by said starting switch to release said clutch for rotation.

In testimony whereof I hereunto affix my signature.

ROBERT O. FORTUNE.